April 13, 1954

R. D. HULL 2,675,193

FISHING REEL

Filed July 26, 1949

INVENTOR.
R. Dell Hull
BY
Ennis Edmonds, Morton and Barrows
ATTORNEYS

Patented Apr. 13, 1954

2,675,193

UNITED STATES PATENT OFFICE 2,675,193

FISHING REEL

R. Dell Hull, Tulsa, Okla.

Application July 26, 1949, Serial No. 106,771

14 Claims. (Cl. 242—84.6)

This invention relates to fishing reels and more particularly to devices of the "spinning reel" type. This application is a continuation in part of my copending applications Serial No. 19,211, filed April 6, 1948, and Serial No. 73,056 filed January 27, 1949, both now abandoned.

In such devices the spool on which the line is wound remains stationary during casting and rewinding. Rewinding is controlled by a rotatable head which guides the line on to the spool. In prior constructions this head has also remained stationary during casting. In the present construction I provide a reel in which the head rotates during casting and during rewinding. It is provided with notches which guide the line on to the spool during rewinding and which are so shaped that they throw the line away from the head when the cast is finished, permitting the head to continue to revolve without affecting the line. The construction thus provided eliminates back lash and permits perfect control of the cast from beginning to end.

A further feature of the invention is the provision of improved braking mechanism mounted on the rear side of the reel which can conveniently be operated by the user during the casting operation merely by placing his thumb upon a rotating member carried by the shaft on which the head is mounted.

A further improved feature of the device is the provision of a cover member which prevents the line from "belling" or spiraling as it comes off the spool. In the absence of the improved cover member, the centrifugal force, as the line is thrown off the spool in casting, causes the line to leave the spool in spirals and flap against the rod. The additional air resistance of the spiraling line and the friction of the line hitting against the rod retards the free flow of the line and thus interferes with the casting.

In addition, the reel is constructed so that the axis of the spool and the axis of the cover are substantially parallel to the longitudinal axis of the rod when the reel is in position and the improved cover member permits the line to be fed from the spool without making a substantially right angle turn at the point where it passes through the eye of the cover.

Further advantages of the construction are its simplicity permitting it to be economically made, the fact that no adjustments are necessary and that it fits any conventional fishing rod. By means of the construction a long, effortless cast may be obtained.

In the present application there is disclosed an improved clutch mechanism for effecting engagement and disengagement of the shaft carrying the spinning head and the shaft of the winding crank. While such mechanism is claimed herein, in combination with other elements of the fishing reel, claims directed to the clutch per se, form the subject matter of my copending application, Serial No. 73,055, filed January 27, 1949, now Patent No. 2,541,360.

In the accompanying drawing I have shown one embodiment of the invention. In this showing:

Figure 1:
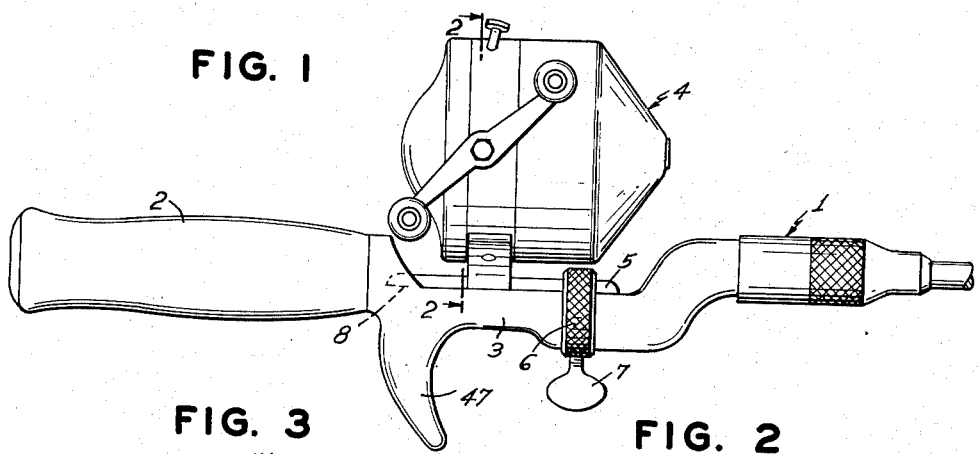
Fig. 1 is an elevation of the reel in position on a fishing rod.

Referring to the drawing, the reference numeral 1 designates generally a fishing rod of any desired construction. This rod is provided with a handle portion 2 and is further provided with a reel receiving portion 3, which is flattened on its upper side.

The reel 4 is mounted on a supporting plate 5 adapted to be secured to the reel receiving portion of the handle. As shown, a securing ring 6 is arranged on the reel receiving portion of the rod and is provided with a set screw 7 to tighten it and retain the reel in position. In the construction shown where the reel receiving portion of the rod merges with the handle portion, there is provided a slot 8 for the reception of the end of the supporting plate 5.

Figure 6:
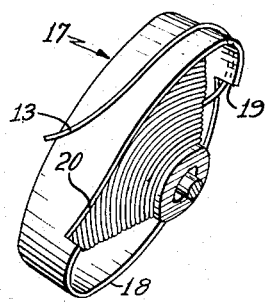
Fig. 6 is a perspective view of the rotatable head and a portion of the spool.
Figure 5:
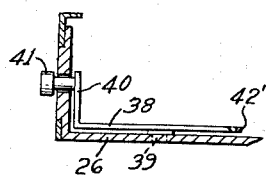
Fig. 5 is a detailed, sectional view of a click mechanism on line 5—5 of Fig. 2.
Figure 4:
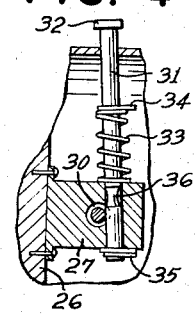
Fig. 4 is a detailed, sectional view of the clutch mechanism on line 4—4 of Fig. 2.

The reel comprises a casing 9 formed of any suitable material and provided with a front cover 10 and a rear cover 11. These covers snugly fit on the casing and may be removed when desired. A spool 12 is mounted in the casing and is adapted to receive line 13, the line being not shown in Fig. 3 to permit illustration of the construction of the reel but being shown in association with the spool and the head in Fig. 6 of the drawing.

A main shaft 14 extends through the reel, the shaft being supported in a bearing 16 mounted in an axial opening in the spool. This shaft carried a head 17 which, as shown, comprises a disc of slightly greater diameter than the diameter of the spool and provided with a flange 18 extending rearwardly over the spool. The edge of this flange is provided with a plurality of notches 19 connected to each other by inclined edges 20 (see Fig. 6).

A pinion 21 is mounted on the main shaft rearwardly of the spool and meshes with pinion gear 22. The latter is mounted on a crank shaft 23 which extends through a bearing 24 on the side of the casing and is provided with an operating handle 25. Crank shaft 23 is movably mounted to permit the gears 21 and 22 to be engaged and disengaged. Bearing 16 extends from the hub of pinion 21 to the spinner head 17. The use of this single bearing takes care of end play and eliminates all aligning difficulties.

Mounted on the wall 26 of the casing, which forms the rear of the spool, is a bearing block 27. The shaft 23 is movable in a bore in this block. A spring 28 is arranged between the bearing block and a washer 29 mounted on the shaft. The spring normally retains the shaft 23 to the right in Fig. 2 to disengage the gears 21 and 22. On the portion of the shaft within the bearing block the shaft is provided with a circumferential groove 30 curved on a circular radius.

A clutch operating rod or shaft 31 extends through an opening in the top of the casing and is provided with a button 32 on its upper end. A coil spring 33 is arranged on the shaft between the top of the bearing block 27 and a washer 34, which is secured to the shaft 31. A washer 35 is locked on the lower end of the rod or shaft 31 to limit its upward movement. The portion of the rod or shaft within the bearing block is also provided with a circumferential groove 36 cut on the radius of a circle.

The reel is also provided with a click mechanism formed of a single piece 37 of flat spring steel. The intermediate portion 38 is arranged to lie flat against the face of wall 26 and is pivoted thereon by means of a pivot pin 39. The end portion 40 is bent at right angles to the intermediate portion to lie parallel to the wall of the casing 9 and is provided with a thumb button 41 extending through opening 42 to the exterior of the casing. The opposite end 42' of the strip is narrowed and twisted at right angles to the plane of the intermediate portion forming a flexible finger which extends toward the teeth of pinion 21.

The brake mechanism consists of a disc-like member 43 which is mounted on a hub 44. The hub is secured to the main shaft 14. The brake is shaped to follow the contour of the cover member 11 and is slightly spaced from it. The cover member is provided with an opening 45 through which the thumb may be placed to engage the brake member.

Figure 3:
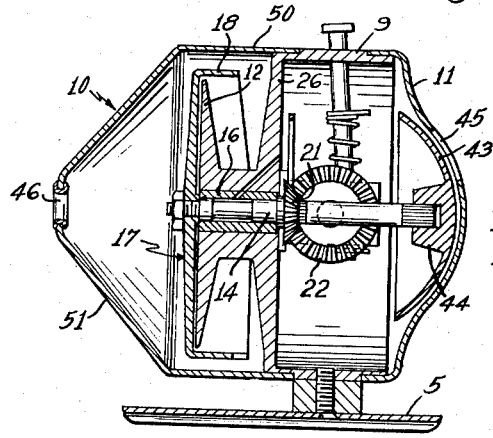
Fig. 3 is a longitudinal, sectional view on line 3—3 of Fig. 2.

As shown in Figs. 1 and 3 of the drawing, the front cover comprises a cylindrical flange 50 which is snugly received on the casing 9. Beyond the plane of the spool 12 and the head 17 it is provided with a curved or generally conical portion 51 having the opening 46 arranged at the center and in axial alignment with the shaft 14. In the preferred form of the invention the conical portion is at an angle of substantially 55° although this angle may, of course, vary within wide limits. The provision of the conical wall 51 with the opening 46 centrally located at the top of the cone tends to overcome the effect of centrifugal force as the line is thrown off the spool and thus eliminates the friction caused by the line flapping against the rod together with the additional air resistance of the spiraling line. It will also be noted that the line is fed from the spool in a more nearly straight line and as it passes through the opening 46 it is not necessary for the line to make an abrupt change in direction to feed outwardly along the rod. The construction also permits the reel to be used on a conventional or "offset" casting rod as illustrated in Fig. 1 of the drawing.

While the cover is illustrated as a cone, or a frustrum of a cone, other shapes that provide a substantially central location for opening 46, as far away from the spinner head as possible and still permit the reel to be mounted on a conventional casting rod, may be employed. Thus, the covering may be a parabola, a dome, or other similar shape.

The operation of the device will be apparent from the foregoing description. Normally in casting, the gears 21 and 22 are disengaged. The cast is made in the usual manner and the weight of the lure causes the line to be fed from the reel. The line passing over the head engages one of the notches 19 and rotates the head. As long as the line is being pulled from the spool, the head continues to revolve. When the cast is finished and the line stops its outward pull, the line is thrown from the notch in the head which permits the head to continue to rotate until its rotation is stopped by friction. This results in the elimination of any back lash.

During casting, the brake member 43 rotates with the shaft 14. It will be noted that the opening 45 is disposed on the rear cover member permitting the brake to be operated by the thumb. The caster holding the handle portion 2 of the rod with his forefinger on the finger grip 47 may use his thumb at any time to brake the release of the line from the spool. By pressing the ball of the thumb through the opening 45 into contact with the disc 43, the braking operation is effected. The front cover is provided with an opening 46, preferably centrally arranged, through which the line is fed.

To disengage the pinions 21 and 22 during the casting operation, rod 31 is moved downwardly by thumb pressure applied to its upper end to overcome the force of spring 33. This moves the groove 36 downwardly into registration with shaft 23. Shaft 23 is then free to move to the right under the force of spring 28. The spacing between the face of block 27 and the adjacent face of the hub of pinion 22 is so dimensioned that the left hand end of groove 30 will stop before reaching the axis of rod 31. This provides an off-center contact between the curved surfaces of the grooves when the pinions are disengaged. As long as shaft 23 remains stationary, the pressure of coil spring 28 will maintain the grooves in engagement and maintain the pinions disengaged, thus permitting free rotation of shaft 14 and the spinner head.

When the line is to be rewound, the pinions 21 and 22 may be re-engaged by turning handle 25 in either direction. When shaft 23 is rotated, the curved surfaces of the grooves 30 and 36, which are in engagement, function as cams and rotation of the shaft initiates relative movement of these surfaces. Coil spring 33 is of greater strength than coil spring 28 and when this movement is begun, the greater strength of it causes an upward movement of rod 31. Therefore, upon revolving shaft 23, the frictional engagement of the curved surfaces is overcome and rod 31 moves upwardly under the urging of spring 33. The cam action of the sloping surface of groove 36 and the sloping surface of groove 30 produces a movement of shaft 23 to the left to bring the pinions into engagement. Thus, when the pinions are to be brought into mesh for rewinding, it is merely necessary to begin turning the shaft 23 without resorting to any other mechanical operation to engage the clutch.

Figure 2:
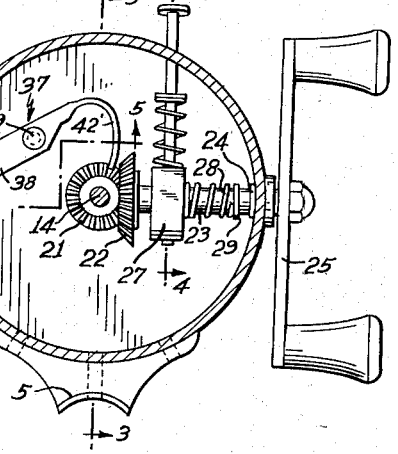
Fig. 2 is a transverse, vertical, sectional view on line 2—2 of Fig. 1.

The click device is shown in Fig. 2 in operative position. By moving the button 41 downwardly, the device is swung on pivot 39 to bring the end 42' out of engagement with the teeth of pinion 21.

It will be apparent from the foregoing description that I have provided a device of the "spinning reel" type which is of simpler construction than of this sort heretofore employed and which has many advantages over such prior devices. While I have shown and described a preferred form of the invention, it is of course understood that modifications therein, within the scope of the appended claims, may be made without departing from the spirit of the invention.

I claim:

1. A casting reel comprising a casing, a spool in the casing, a shaft extending through the spool, a rotating head mounted on the shaft in front of the spool, the head being provided with a peripheral flange extending over the spool, the edge of the flange being shaped to form portions to be engaged by a line, a crank shaft mounted in the casing and being axially movable, gears on the shaft and crank shaft to mesh with each other in one position of the crank shaft, and means for moving the crank shaft to bring the gears into and out of engagement.

2. A casting reel comprising a casing, a spool in the casing, a shaft extending through the spool, a rotating head mounted on the shaft in front of the spool, the head being provided with a peripheral flange extending over the spool, the edge of the flange being shaped to form portions to be engaged by a line, a crank shaft mounted in the casing and being axially movable, gears on the shaft and crank shaft to mesh with each other in one position of the crank shaft, a spring surrounding the crank shaft to normally retain it in a position in which the gears are disengaged, and means for locking the shaft in position to engage the gears.

3. A casting reel comprising a casing, a spool in the casing, a shaft extending through the spool, a rotating head mounted on the shaft, the head being provided with a peripheral flange extending over the spool, the edge of the flange being shaped to form portions to be engaged by a line, a crank shaft mounted in the casing and being axially movable, gears on the shaft and the crank shaft to mesh with each other in one position of the crank shaft, a spring surrounding the crank shaft to normally retain it in a position in which the gears are disengaged, the crank shaft being provided with a circumferential groove, and an actuating member arranged at an angle to the crank shaft, said actuating member having a circumferential groove engaging the groove of the crank shaft.

4. A casting reel comprising a casing, a spool in the front part of the casing, a shaft extending through the spool to the rear of the casing, a rotatable head fixed to the shaft, the edge portion of the head being shaped to receive a line, and brake mechanism comprising a disc secured to the rear end of the shaft, the casing being provided with an opening adjacent the disc.

5. A casting reel comprising a spool, a shaft extending through the spool, a rotating head mounted on the shaft in front of the spool, the edge portion of said head adjacent the spool being shaped to engage a line passing to and from said spool, means for rotating said shaft and said head to retrieve and wind line onto the spool, and clutch means to disconnect said shaft and head rotating means from said shaft and head to permit free rotation of said head by the line during a casting operation.

6. A casting reel comprising a spool, a shaft extending through the spool, a rotating head mounted on the shaft in front of the spool, said head and said spool being fixed against relative movement axially of each other, and means projecting from the edge portion of the head adjacent said spool adapted to be engaged by a line during casting to rotate the head and being further adapted to pick up the line when the head is rotated in the opposite direction to rewind the line, said means being so constructed and arranged that it is disengaged by the line during all portions of a casting operation when the head may rotate faster than the line is withdrawn from the spool.

7. A casting reel comprising a casing, a spool fixedly mounted in the casing, a shaft extending through the spool, a rotatable head comprising a disc fixed to the shaft in front of the spool, said head and said spool being fixed against relative movement axially of each other, the head being provided with a flange extending over the spool, and means projecting from said flange adapted to be engaged by a line during casting to rotate the head and being further adapted to pick up the line when the head is rotated in the opposite direction to rewind the line, said means being so constructed and arranged that it is disengaged by the line during all portions of a casting operation when the head may rotate faster than the line is withdrawn from the spool.

8. A casting reel comprising a casing, a spool in the front part of the casing, a shaft extending through the spool, a rotatable head fixed to the shaft in front of said spool, said head and said spool being fixed against relative movement axially of each other, the edge portion of the head adjacent the spool being shaped to engage a line passing to and from the said spool, means for rotating said shaft and said head to wind a line on said spool, and clutch means for disconnecting said rotating means from said shaft whereby said shaft and head may rotate freely during casting.

9. A casting reel according to claim 8 in which a portion of the casing overlies said rotatable head, said portion being generally cone-shaped and being provided with a central opening for the passage of the line.

10. A casting reel comprising a casing, a spool fixedly mounted in the casing, a shaft extending through the spool, a rotatable head comprising a disc fixed to the shaft in front of the spool, said head and said spool being fixed against relative movement axially of each other, the head being provided with a flange extending over the spool, means projecting from said flange adapted to be engaged by a line during casting to rotate the head and being further adapted to pick up the line when the head is rotated in the opposite direction to rewind the line, said means being so constructed and arranged that it is disengaged by the line during any portion of a casting operation when the head may rotate faster than the line is withdrawn from the spool, means for rotating said shaft and said head to retrieve and wind line onto the spool, and clutch means to disconnect said shaft and head rotating means from said shaft and head to permit free rotation of said head by the line during the casting operation.

11. A casting reel comprising a spool, a rotating head mounted in front of the spool, the edge portion of said head adjacent the spool being shaped to engage a line passing to and from said spool, means for rotating said head to retrieve and wind line onto the spool, and clutch means to disconnect said head rotating means from said head to permit free rotation of said head by the line during a casting operation.

12. A casting reel comprising a spool, a rotating head mounted in front of the spool, the edge portion of said head adjacent the spool being shaped to engage a line passing to and from said spool, means for rotating said head to retrieve and wind line onto the spool, clutch means to disconnect said head rotating means from said head to permit free rotation of said head by the line during a casting operation, and brake means mounted rearwardly of the spool to control the line during casting.

13. A reel including a spool constructed for casting line directly from the spool, said reel comprising a shaft extending through the spool, a rotating head mounted on the shaft in front of the spool, said head and said spool being permanently fixed against relative movement axially of each other, and the edge portion of the head adjacent said spool being shaped and permanently positioned to engage a line passing to and from said spool and said head being freely rotatable by the line in its passage from the spool during casting.

14. A reel including a spool constructed for casting line directly from the spool, said reel comprising a shaft extending through the spool, a rotating head mounted on the shaft in front of the spool, said head and said spool being permanently fixed against relative movement axially of each other, and the edge portion of the head adjacent said spool being shaped and permanently positioned to engage a line passing to and from said spool and said head being freely rotatable by the line in its passage from the spool during casting, and brake means mounted rearwardly of the spool to control the line during casting.

References Cited in the file of this patent

UNITED STATES PATENTS

| Number | Name | Date |
| --- | --- | --- |
| 16,626 | Deacon | Feb. 10, 1857 |
| 390,752 | Cashin | Oct. 9, 1888 |
| 632,079 | Wilcox et al. | Aug. 29, 1899 |
| 2,034,917 | Miller | Mar. 24, 1936 |
| 2,179,413 | Kolosso | Nov. 7, 1939 |
| 2,229,470 | Pezon | Jan. 21, 1941 |
| 2,344,209 | Lowe | Mar. 14, 1944 |
| 2,428,324 | Worden | Sept. 30, 1947 |
| 2,492,587 | Ledingham | Dec. 27, 1949 |
| 2,507,457 | Rix | May 9, 1950 |
| 2,548,073 | Siegrist | Apr. 10, 1951 |
| 2,584,020 | Humphreys | Jan. 29, 1952 |
| 2,600,558 | Mauborgne | June 17, 1952 |

FOREIGN PATENTS

| Number | Country | Date |
| --- | --- | --- |
| 22,597 of 1907 | Great Britain | June 14, 1908 |
| 8,517 of 1910 | Great Britain | Apr. 8, 1910 |
| 18,723 of 1910 | Great Britain | Aug. 9, 1910 |
| 383,438 | Great Britain | Nov. 17, 1932 |
| 418,837 | Great Britain | Nov. 1, 1934 |
| 816,045 | France | Apr. 19, 1937 |
| 487,813 | Great Britain | June 27, 1938 |
| 909,825 | France | Jan. 7, 1946 |